United States Patent [19]
Cozens et al.

[11] Patent Number: 5,247,019

[45] Date of Patent: * Sep. 21, 1993

[54] FROSTED POLYMERIC ARTICLES AND PROCESS FOR PRODUCING SAME

[75] Inventors: Ross J. Cozens, Strongsville; William S. Greenlee, Avon Lake; Douglas E. Skillicorn, Elyria, all of Ohio

[73] Assignee: The B. F. Goodrich Company, Brecksville, Ohio

[*] Notice: The portion of the term of this patent subsequent to Jul. 14, 2009 has been disclaimed.

[21] Appl. No.: 714,119

[22] Filed: Jun. 11, 1991

Related U.S. Application Data

[63] Continuation-in-part of Ser. No. 449,487, Dec. 11, 1989, abandoned, which is a continuation of Ser. No. 99,818, Sep. 27, 1987, abandoned.

[51] Int. Cl.$^5$ ............................................. C08L 27/06

[52] U.S. Cl. .................................. 525/239; 524/515; 524/525; 524/527

[58] Field of Search ................ 525/239; 524/515, 525, 524/527

[56] References Cited

FOREIGN PATENT DOCUMENTS 0104433  8/1983  European Pat. Off. .

Primary Examiner—Paul R. Michl
Assistant Examiner—Edward Cain
Attorney, Agent, or Firm—Miles B. Dearth

[57] ABSTRACT

Optically transparent frosted polymeric articles are disclosed which can be produced in smooth molds. Polymeric articles, such as PVC bottles, are molded from a composition having two polymers with different viscoelastic properties. A particularly desirable composition is one containing both PVC and crosslinked PVC.

32 Claims, 2 Drawing Sheets

100 μm

100μm

FROSTED POLYMERIC ARTICLES AND PROCESS FOR PRODUCING SAME

This is a continuation-in-part of application Ser. No. 07/449,487 filed on Dec. 11, 1989 now abandoned, which is a continuation of application Ser. No. 07/099,818 filed on Sep. 27, 1987, now abandoned.

BACKGROUND OF THE INVENTION

Polymeric articles because of their inherent properties are replacing glass in many end use applications, such as bottles, packaging, containers, window panes, light covers, shower doors, and the like. Some of these applications are enhanced by a "frosted" look either for practical reasons such as to block sight through the material or for aesthetic reasons. Glass is normally made frosted by etching the surface of the glass to create a light scattering and thus the frosted look is achieved. Because many polymerics cannot withstand a mechanical etching process such as sandblasting, other methods must be used to achieve the frosted appearance. To create the frosted glass look in polymeric articles, those skilled in the art will etch the mold by sandblasting or other means to give a rough surface on the mold. The rough surface on the mold transfers to the moldable polymeric article, thus creating a frosted appearance.

The practice of altering the molds is an expensive process because the mold cannot be used again for non-frosted articles. Many molding machines for polymerics have multi-cavity molds and thus several cavities must be altered. Injection blow molding is a common process used to produce bottles. The molds for this process cost from about $100,000 to $200,000, thus making the increased inventory of molds uneconomical. Also, some polymeric materials such as polyvinyl chloride (PVC), when injection blow molded into bottles, have a low pressure applied to the PVC during the molding process, such that the PVC would not be forced into the mold at sufficient pressure to transfer a small surface roughness to the PVC bottle. This explains the absence of frosted PVC bottles from the marketplace, even though they are desired by customers.

For the rare polymeric materials which can withstand a post molding treatment of etching, the post molding treatment is an added process which adds greatly to the cost of the article.

It would be desirable to have a process which could produce frosted polymeric articles which did not involve etching the mold or an abrasive aftertreatment, and which could be molded in conventional smooth molds.

SUMMARY OF THE INVENTION

It is an object of the invention to provide frosted polymeric articles.

It is a further object of this invention to provide a process for producing these novel frosted polymeric articles.

It is an additional object of this invention to provide compositions which are suitable for the production of frosted polymeric articles.

These and other objects which will become evident from the following disclosure are accomplished by forming a polymeric article from a composition comprising a first polymeric component and a second polymeric component, wherein said first polymeric component and said second polymeric component have different viscoelastic properties. Preferably, the first polymeric component and the second polymeric component also have similar optical properties such as refractive index.

In the most preferred embodiment of this invention, the first polymeric component is a PVC polymer and the second polymeric component is a crosslinked PVC.

DETAILED DESCRIPTION OF THE INVENTION

Figure 1:
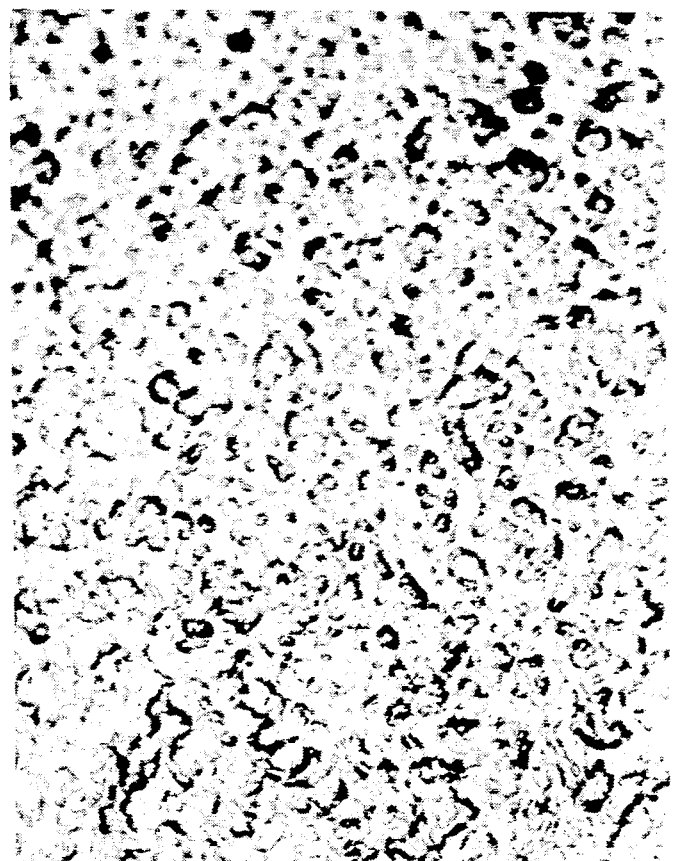
FIG. 1 is an optical microscope photograph showing an extruded strip according to this invention made with the composition of Example 1, run 4. The microfracture or roughness of the surface is visible from the photograph. The scale of the photograph is 1 inch = 100 $\mu$m.

The polymeric materials used to produce the articles of this invention include polymeric materials such as polyvinyl chloride and optically transparent copolymers of polyvinyl chloride, polyester, polycarbonate, polystyrene, polymethyl methacrylate and the like. Any optically transparent polymer or polymer which can be rendered optically transparent by appropriate processing is useful in this invention. The term polymer includes oligomers, copolymers, terpolymers or higher order polymers of materials normally referred to as thermoplastic or elastomeric and blends thereof. The invention will be described in terms of a polyvinyl chloride article.

The frosted articles of this invention include articles such as bottles, packaging sheet, containers, window panes, light covers, shower doors, door panels, imitation glass block and the like. The invention will be described in terms of a frosted bottle but other articles could be made using this invention. The articles may be rigid or flexible depending upon the desired end use application.

The articles of this invention are optically transparent in the interior of the article but demonstrate limited light transmission due to a surface microfracture or roughness resulting from different viscoelastic properties of the article's polymeric components. This contrasts with a consistent haziness throughout an article produced with two polymeric materials, which when blended together, have different refractive indices.

The polymeric compositions used to produce the articles of this invention are optically transparent compositions. That is, the compositions are substantially free of pigments which block the transmission of light. The composition needs to be optically transparent in order to give an aesthetically appealing frosted look. With an optically transparent composition the frosted article has a sparkle appearance much like frosted glass. The compositions may, however, contain a tinting pigment, to give a color effect to the article while still allowing the article to transmit light.

The compositions may be rigid, semi-rigid or flexible. Rigid compositions are those which contain less than about 10 parts by weight of plasticizer per 100 parts by weight of polymer, other than the stabilizers, lubricants and processing aids. Likewise, semi-rigid compositions contain from about 10 to about 40 parts plasticizer, while flexible compositions contain greater than about 40 parts by weight plasticizer per 100 parts by weight polymer. The term plasticizer includes materials such as oil extenders and other materials which soften the product.

The compositions of this invention must contain at least two polymeric components, that is a first polymer component and a second polymer component. The first and second polymer components must have different viscoelastic properties. Preferably, the first polymer component and the second polymer component also have similar optical properties, such as refractive index. The term similar optical properties also means that when the first and second polymers are mixed together, the interior of the article produced has good light transmission, preferably greater than about 60% to light transmission. It should be recognized that some polymers can have different refractive indices in their initial state, but when worked together in a mixing operation will have similar refractive indices. This can occur because of crystallinity of one of the polymers. For the interior of the article to be optically transparent, the polymers in the final mixed or combined state should have similar refractive indices, or be so miscible that they will have domain sizes small enough to provide good light transmission.

One method to achieve different viscoelastic properties is to crosslink a polymer, thus making the polymer more rubber-like. Therefore, the first polymer component could be polyvinyl chloride while the second polymer component could be crosslinked polyvinyl chloride. When polyvinyl chloride is crosslinked, its optical properties remain essentially unchanged, as can be calculated by those skilled in the art, but its viscoelastic properties are substantially changed. The viscoelastic properties at a given temperature can also be changed in polyvinyl chloride by increasing the molecular weight. Molecular weight is commonly expressed as inherent viscosity (IV). Inherent viscosity is measured according to ASTM Procedure D-1243. PVC polymers having an IV greater than 1.02, preferably greater than 1.4, are materials where the high molecular weight, and thus high crystallinity, exhibit behavior similar to crosslinked PVC at temperatures below which the crystals melt. The higher IV material tends to be more crystalline and the crystals act like crosslinks as long as they are maintained below their melting point.

The first and second polymer components may both be present as one resin. For example, a core/shell overpolymer could be formed by making a crosslinked PVC core and then overpolymerizing with vinyl chloride to form a crosslinked PVC core with a non-crosslinked PVC shell. In this instance, both the first and second polymer would be present in the same resin particle. Crosslinked PVC resin particles often contain both crosslinked PVC and uncrosslinked PVC. Depending on the selection of the crosslinking agent, the crosslinking agent can be completely reacted with vinyl chloride during the early part of the polymerization, in which case the following part of the polymerization would be producing homopolymer PVC that is not crosslinked.

The following Table I, although not exhaustive, represents various possible combinations of polymers to give first and second polymer components with desired optical and viscoelastic properties:

TABLE I

| Composition No. | First Polymer | Second Polymer |
| --- | --- | --- |
| 1. | Polyvinyl chloride (rigid, semi-rigid, or flexible) | Crosslinked polyvinyl chloride, very high molecular weight polyvinyl chloride, crosslinked polyester |
| 2. | Polyester | Crosslinked polyvinyl chloride, crosslinked polyester |
| 3. | Polystyrene | Crosslinked polystyrene |
| 4. | Polycarbonate | Crosslinked polycarbonate |
| 5. | Polymethylmethacrylate | Crosslinked polymethylmethacrylate |
| 6. | Poly 4-methyl-pentene-1 | Crosslinked poly 4-methyl-pentene-1 |
| 7. | Optically transparent nylon | Crosslinked nylon |
| 8. | Polyarylate | Crosslinked polyarylate |
| 9. | Polysulfone | Crosslinked polysulfone |
| 10. | Polyurethane | Crosslinked polyurethane |
| 11. | Silicone | Crosslinked silicone |
| 12. | Vinyl chloride copolymers | Crosslinked polyvinyl chloride |
| 13. | Lightly crosslinked polyvinyl chloride | Heavily crosslinked polyvinyl chloride |
| 14. | Cellulose acetate | Crosslinked cellulose acetate |
| 15. | Cellulose acetate butyrate | Crosslinked cellulose acetate butyrate |
| 16. | Ionomer resin | Crosslinked ionomer resin |
| 17. | Styrene butadiene thermoplastic elastomer | Crosslinked styrene butadiene thermoplastic elastomer |
| 18. | Styrene-acrylonitrile copolymer | Crosslinked styrene-acrylonitrile copolymer |
| 19. | Ethylene ethyl acrylate copolymer | Crosslinked ethylene ethyl acrylate copolymer |
| 20. | Ethylene methyl acrylate copolymer | Crosslinked ethylene methyl acrylate copolymer |

When rubbery polymers with different optical properties than polyvinyl chloride are added to polyvinyl chloride compositions, the molded article becomes excessively hazy, which is undesirable. This is the case when many conventional impact modifiers such as acrylonitrile-butadiene-styrene and acrylate rubbers are added to polyvinyl chloride. Amounts of rubbery impact modifiers which result in haze should be held to a minimum or not used at all so as to achieve a high degree of optical transparency. Certain specialty impact modifiers are available which give optically transparent compositions with PVC but these compositions do not exhibit a surface frosting effect.

The invention will be further described with the preferred embodiment of a rigid optically transparent frosted polyvinyl chloride (PVC) article made with a mixture of PVC polymer and crosslinked PVC polymer.

PVC polymers as used in this invention means polyvinyl chloride homopolymers as well as vinyl chloride polymerized with up to 50%, preferably up to 20%, by weight of one or more other monomer which will give an optically transparent copolymer with vinyl chloride. Suitable comonomers that may be used to give an optically transparent copolymer includes esters of acrylic acid, for example, methyl acrylate, ethyl acrylate, butyl acrylate, octyl acrylate, cyanoethyl acrylate, and the like; vinyl acetate; esters of methacrylic acid, such as methyl methacrylate, ethyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other olefinic monomers copolymerizable therewith; and other monomers known to those skilled in the art which will give optically transparent copolymers with vinyl chloride. The amount of comonomer that can be polymerized with vinyl chloride to give an optically transparent copolymer is a function of the choice of comonomer, as is well understood by those skilled in the art. Some of the comonomers listed herein will give undesirable hazy copolymers if the comonomer is used at levels greater than about 3%. Preferably, the polyvinyl chloride polymer of this invention is a polyvinyl chloride homopolymer.

The PVC polymer of this invention may be produced by any of the known polymerization processes such as mass, suspension, solution or emulsion. Mass and suspension are the preferred processes to produce the PVC polymer. The process to be described is a suspension process. When using the suspension process, suitable dispersing agents or suspending agents, such as known in the art, may be used. Examples of suitable dispersants are partially hydrolyzed polyvinyl alcohol, cellulose ethers, starch, gelatin, and the like. The level of dispersant used will be less than about 2.0 parts by weight, preferably less than about 0.5 part by weight per 100 parts by weight of monomer. Excellent results are obtained with from 0.05 to 0.3 part by weight of dispersant per 100 parts by weight of monomer.

The polymerization is initiated with a free radical catalyst. The monomer-soluble or oil-soluble catalysts that may be used in the polymerization process to produce the polyvinyl chloride polymer used in this invention are the alkanoyl, aroyl, alkaroyl, and aralkanoyl diperoxides and monohydroperoxides, azo compounds, peroxy ester, percarbonates, and other free radical type catalysts. As examples of such catalysts, there may be named benzoyl peroxide, lauryl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, 5-butyl peroxyneodecanoate, di-normal propyl peroxydicarbonate, azobisisobutyronitrile, α,α'-azodiisobutyrate, 2,2'-azo-bis-(2,4-dimethyl valeronitrile), and many others. The particular free radical catalyst employed will depend upon the monomeric material(s) being polymerized, the molecular weight and color requirements of the polymer, the temperature of polymerization, etc. Insofar as the amount of catalyst employed is concerned, it has been found that an amount in the range of about 0.005 parts by weight to about 1.00 parts by weight, based on 100 parts by weight of the monomer or monomers being polymerized, is satisfactory. However, it is preferred to employ an amount of catalyst in the range of about 0.01 part by weight to about 0.20 part by weight based on 100 parts by weight of monomer(s).

The preferred suspension polymerization process to produce the PVC polymers of this invention may be carried out at any temperature which is normal for the monomeric material to be polymerized. Preferably, a temperature in the range of about 0° C. to about 100° C. is employed, more preferably from about 40° C. to about 85° C. In order to facilitate temperature control during the polymerization process, the reaction medium is kept in contact with cooling surfaces cooled by water, brine, evaporation, etc. This is accomplished by employing a jacketed polymerization reactor wherein the cooling materials are circulated through the jacket throughout the polymerization reaction. This cooling is necessary since most all of the polymerization reactions are exothermic in nature. It is understood, of course, that a heating medium can be circulated through the jacket, if necessary.

The second polymer that is used in the preferred embodiment of this invention is a crosslinked PVC polymer. The term PVC polymer as used to describe the crosslinked PVC polymer has the same meaning as the above description of PVC polymer for the first polymer which includes copolymers with vinyl chloride as described above. Preferably, the second polymer is a crosslinked PVC homopolymer. The term polyvinyl chloride homopolymer as used to describe the second polymer in this specification includes the polymerized vinyl chloride as well as the small amount of crosslinking agents. Technically, the crosslinked PVC of this invention will always be a copolymer, because the crosslinking agent copolymerizes with the vinyl chloride. However, the amount of crosslinking agent is so small that in this specification the crosslinked PVC having only vinyl chloride and crosslinking agent as monomers will be referred to as a crosslinked PVC homopolymer. The invention will be described in terms of a crosslinked polyvinyl chloride homopolymer as the preferred embodiment for the second polymer of this invention.

The inherent viscosity of polyvinyl chloride used in combination with crosslinked polyvinyl chloride can range from about 0.4 to 2.5. Preferably, the I.V. for this uncrosslinked polymer ranges from about 0.4 to less than 1.4 with the most preferred I.V. range of 0.4 to 1.2.

The combined resin composition containing uncrosslinked and crosslinked PVC will have a behavioral equivalent I.V. compared to a single uncrosslinked PVC composition, ranging from about 0.4 to about 2.0 with a preferred behavioral equivalent I.V. of from 0.8 to about 1.6.

The preferred crosslinking agents are those materials which are soluble in the vinyl monomer and the vinyl polymer. The reactivity ratio of the crosslinking agent should be such that it prefers to add to itself. The rate constants (K) can be expressed as:

vinyl monomer + vinyl monomer $\xrightarrow{k_{11}}$ vinyl polymer

vinyl monomer + crosslinking agent $\xrightarrow{k_{12}}$

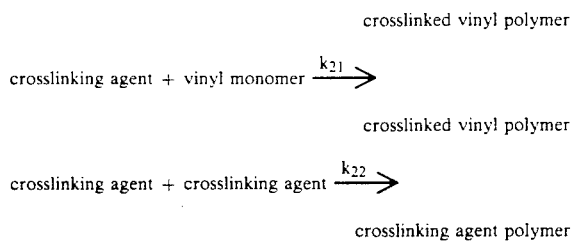

The monomer reactivity ratio of vinyl monomer ($R_1$) can be expressed as $$R_1 = \frac{K_{11}}{K_{22}}$$

The monomer reactivity ratio of the crosslinking agent ($R_2$) can be expressed as $$R_2 = \frac{K_{22}}{K_{21}}$$

Ideally the product of $R_1$ and $R_2$ would be equal to 1 ($R_1 \times R_2 = 1$).

The crosslinking agents preferably should be completely reacted before the normal termination of the polymerization, so as not to have crosslinking monomer present as residual monomer in the vinyl polymer. Vinyl chloride polymerizations are normally run to a % conversion of monomer to polymer of from about 50% to 90%, preferably from about 65% to about 80%. The conversions can of course be higher or lower depending on the desired properties of the resin.

The crosslinking agents which are suitable to produce the crosslinked PVC used in this invention include, for example, diallyl phthalates such as diallyl phthalate, diallyl isophthalate, diallyl terephthalate, etc.; other esters such as diallyl maleate, diallyl fumarate, diallyl itaconate, diallyl adipate, diallyl azelate, diallyl sebacate, triallylcyanurate, triallyl isocyanurate, triallyl trimellitate, etc.; vinyl ethers such as diallyl ether, ethylene glycol divinyl ether, n-butanediol divinyl ether, octadecane divinyl ether, etc; esters such as di(meth)acryl esters of polyhydric alcohols such as ethylene glycol dimethacrylate, diethylene glycol dimethacrylate, diethylene glycol diacrylate, triethylene glycol dimethacrylate, etc.; tri(meth)acryl esters of polyhydric alcohols such as trimethylolpropane trimethacrylate, trimethylolethane trimethacrylate, trimethylolpropane triacrylate, trimethylolmethane triacrylate, tetramethylolmethane triacrylate, etc; polyfunctional compounds such as bismethacryloyloxyethylene phthalate, 1,3,5-triacryloylhexahydrotriazine, etc. A mixture of more than one crosslinking agent may be used. Diallyl phthalate is the most preferred crosslinker for making the crosslinked PVC polymer used in this invention.

The crosslinking agent may be added to the polymerization medium in any manner known to those skilled in the art; such as premixing with the vinyl monomer before charging, charging directly into the polymerization medium or metering into the reaction during the polymerization. The preferred method is to first premix the crosslinking agent with the vinyl monomer before charging to the reaction vessel. If a mass polymerization is used to produce the crosslinked PVC polymer, then the crosslinking agent could be added at any location in the process such as the prepolymerizer or the autoclave, preferably the crosslinking agent should be added in the prepolymerizer.

The amount of crosslinking agent used to make the crosslinked PVC polymer used in this invention is from about 0.05 part by weight to about 5.0 parts by weight, preferably about 0.15 part to about 1.0 part by weight, more preferably about 0.25 part to about 0.6 part by weight per 100 parts by weight of vinyl monomer. The amount used varies with the degree of crosslinking desired.

If one elects to use polymers other than PVC to produce frosted clear articles, then the selection of crosslinking agent would depend upon the relative reactivity rates of the monomer being polymerized and the crosslinking agent. The reactivity ratios of various monomers are published in reference books, and well known to those skilled in the art.

A critical feature of the present invention is that the first PVC polymer and the second PVC polymer have dissimilar viscoelastic properties. Preferably, the first and second PVC polymers also have similar refractive indices.

The method used for determining viscoelastic properties of the polymers used in this invention involves subjecting a disk-shape sample to very small deformation (less than 1% strain) in a cyclic fashion using a Rheometrics Mechanical Spectrometer equipped with oscillating parallel plates. During deformation of the sample, a certain amount of energy is lost due to molecular segmental motions. The remaining energy is stored by elastic mechanisms. These two types of behavior are simultaneously measured during testing and are reflected in the magnitudes of the loss modules (G") and storage or elastic modulus (G'). Also measured is the complex viscosity (n*), which is analogous to the steady state shear viscosity as might be measured by a capillary rheometer.

Complex viscosity is an indication of molecular weight. Intrinsic viscosity (IV) is normally the method of expressing molecular weight of a PVC resin. However, with crosslinked resins the resin is not completely soluble, thus the IV cannot be accurately determined. Therefore molecular weight of the resins of this invention are expressed as complex viscosity, with the units being poise. The complex viscosity is measured at 210° C. The crosslinked PVC polymers suitable for use as the second polymer component of this invention will have a complex viscosity equivalent I.V. of from 0.8 to 1.5, preferably from 0.8 to less than 1.4, and most preferably from 0.9 to 1.2. In equivalent K-values (in cyclohexanone) these ranges corresponds to preferred K-values between 62 and less than 90 and most preferredly between 66 and 75. In terms of complex viscosity, the preferred ranges for complex viscosity are from $0.9 \times 10^6$ poise, to less than (K-value 90) $2.55 \times 10^6$ poise, and most preferredly from $2.2 \times 10^5$ to $1.4 \times 10^6$ poise.

Another important viscoelastic property of the resins of this invention is the tan δ, which is the ratio of the loss modulus (G") to the energy storage modulus (G'). The tan δ can be expressed by the formula:

$$\text{Tan } \delta = \frac{G''}{G'}$$

Tan δ is an indication of the amount of long chain branching (crosslinking) present in the resin. A PVC homopolymer with no crosslinking would have a tan δ of about 1.0. As crosslinking occurs, the tan δ gets smaller. The tan δ of the crosslinked PVC polymers of this invention are less than 1.0, preferably from about 0.1 to about 0.5, more preferably from about 0.2 to about 0.4. The tan δ is measured at 210° C.

The preferred compositions of this invention contain both the non-crosslinked PVC polymer and the crosslinked PVC polymer. The compositions contain a total of 100 parts by weight of PVC polymer, crosslinked and non-crosslinked. For rigid end use applications, such as bottles, the non-crosslinked PVC polymer is preferably present at a level of from about 60 to about 97 parts by weight and the crosslinked PVC polymer is present at from about 3 to about 40 parts by weight. More preferably, the ratio of non-crosslinked to crosslinked PVC is about 80:20 to about 90:10. The degree of crosslinking (tan δ) will somewhat affect the amount of crosslinked PVC needed to create a frosted appearance. When a PVC with a higher degree of crosslinking is used, then less of an amount is needed to give the frosted article. Likewise, if a very lightly crosslinked PVC polymer is used, then a larger amount would be required to give the frosted article. When the compositions are softer, such as when they are semi-rigid or flexible, then the amount of crosslinked PVC used can be greater. For example, with flexible PVC compositions, frosting occurs even with 100% of the PVC being crosslinked PVC. Flexible compositions can contain from about 3 parts to about 100 parts, preferably from about 30 to about 75 parts of crosslinked PVC per 100 total parts PVC.

The compositions will normally contain other ingredients such as stabilizers, lubricants, processing aids, plasticizers and impact modifiers, all of which are to enhance the processing and performance of the composition in its end use application. Small amounts of tinting pigments may be used to give a coloring to the compositions. Pigments which block the passage of light, such as titanium dioxide, should be avoided to achieve an optically transparent article.

The compositions are optically transparent and frosted. A frosted optically transparent appearance creates a light scattering such that an article molded from the untinted compositions will have a high measured % haze value. Preferably, the % haze value is greater than about 15%, more preferably greater than about 50%. Haze is expressed as a percentage and is measured according to ASTM D-1003-61 on a 0.065 inch thick sample. The compositions and articles show a high haze value but this is due only to a surface effect caused by the frosting. The interior of the article has low haze.

The compositions and frosted articles molded with the compositions are optically transparent, that is, they allow light to pass through. The articles have a high degree of clarity, if the frosting effect on the surface is removed. The interior of the article is very clear. The frosting effect of the surface can be masked by placing on the surface oil with a refractive index the same as the PVC and covering the oil with a glass slide. The masked surface has a high degree of % light transmission and a low % haze, thus indicating that the frosting is a surface effect. The compositions can also be compression molded under high pressure and cooled under pressure and the result is no frosting will occur. This is believed to be because the crosslinked PVC is prevented from shrinking by the rigid matrix to create the surface frosting. When the untinted compositions are made to exhibit no frosting, they have a % light transmission greater than about 60%, preferably greater than about 70%. Light transmission is measured according to ASTM Procedure D-1746.

The invention was described above in terms of a crosslinked PVC with a non-crosslinked PVC. One could use a lightly crosslinked PVC with a heavy crosslinked PVC. For example, a lightly crosslinked PVC with a tan greater than about 0.7, preferably greater than 0.9, could be used with a heavily crosslinked PVC with a tan δ less than about 0.5, preferably less than about 0.4. The important feature being that they possess different viscoelastic properties. One could also use a very high molecular weight PVC with an IV greater than about 1.4 in place of the crosslinked PVC with a low molecular weight polyvinyl chloride having an IV less than about 0.8 since the high crystallinity of the high molecular weight PVC would act like crosslinks until the crystals melt. A crosslinked PVC offers much more practical advantage over high IV PVC because the processing temperature range is not as critical as with high molecular weight (high IV) PVC.

The ingredients of the composition of this invention may be mixed by any of the known compounding methods for compounding PVC such as Henschel, mill rolls, Banbury, mixing extruder, and the like. The amount of work applied on the polymers during mixing can effect the amount of frosting achieved. For example, a mixture of PVC and crosslinked PVC which would normally give frosting could be excessively worked during mixing to a point where the two polymers become completely miscible and homogenous therefore eliminating the mixture's ability to create frosting. Normal work applied during mixing will not destroy the frosting ability but the degree of frosting can be varied by mixing conditions.

The compositions of this invention may be shaped to form useful articles by any of the known methods such as calendering, molding, injection blow molding, extrusion blow molding and extrusion. A particularly useful article that can be formed from the composition of this invention is a frosted bottle by either injection blow molding or extrusion blow molding.

Quite surprisingly, it has been found that bottles molded in smooth mold cavities will exhibit a frosted appearance when using the compositions of this invention. Although not certain of the scientific principles involved, it is believed that the different viscoelastic properties of the polymers causes the more rubbery (crosslinked PVC) to relax a different amount after molding, thus creating a fine grained roughness on the surface as can be seen in FIG. 1. This surface roughness creates a frosted effect.

Articles, such as bottles, made according to this invention, have a satin feel. The surface roughness is very shallow which makes bottles of this type highly desirable. They do not have a knobby feel as one would get with high peaks of roughness spaced far apart. The peaks and valleys of the roughness are very even and closely spaced.

To further illustrate the present invention, the following specific examples are given, it being understood that this is merely intended in an illustrative and not a limitative sense. In the examples, all parts and percents are by weight unless otherwise indicated.

EXAMPLE 1

In this example, 4 different PVC compositions were evaluated for their suitability for producing rigid frosted articles. The compositions were all mixed using a Banbury and two roll mill mixers following normal mixing procedures which are well known to those skilled in the art. The mixing procedure was as follows: Banbury mixing to 350° F., and two roll mill mixing at 360° F. mill roll temperature for 2 minutes.

The recipes for the compositions evaluated are as shown in Table II. All amounts of ingredients are shown in weight parts based on 100 weight parts of vinyl chloride polymer.

TABLE II

| Ingredient | 1-control | 2 | 3 | 4 |
|---|---|---|---|---|
| [1]PVC | 100 | 95 | 90 | 80 |
| [2]Crosslinked PVC #1 | — | 5 | 10 | 20 |
| Tin Stabilizer | 2 | 2 | 2 | 2 |
| Impact Modifier | 10.5 | 10.5 | 10.5 | 10.5 |
| Processing Aids & Lubricants | 2.95 | 2.95 | 2.95 | 2.95 |
| Blue Tint | 0.096 | 0.096 | 0.096 | 0.096 |
| % Haze | 5.49 | 12.59 | 34.45 | 62.16 |

[1]PVC homopolymer produced by the mass process having an IV = 0.68
[2]Tan $\delta$ = 0.34 and complex viscosity = 15.3 × $10^5$ poise Strips were extruded from the above 4 compositions on a Brabender extruder using a 4" sheet die with a stock temperature of 350° F. The control (1) had a clear tinted appearance while the remainder of the compositions (2-4) gave a frosted tinted appearance.

The % haze value shows that the haze increases as the amount of crosslinked resin is increased. This is further indication of frosting in that the haze value goes up because of a surface effect and not because of an inherent clarity change in the composition.

Figure 2:
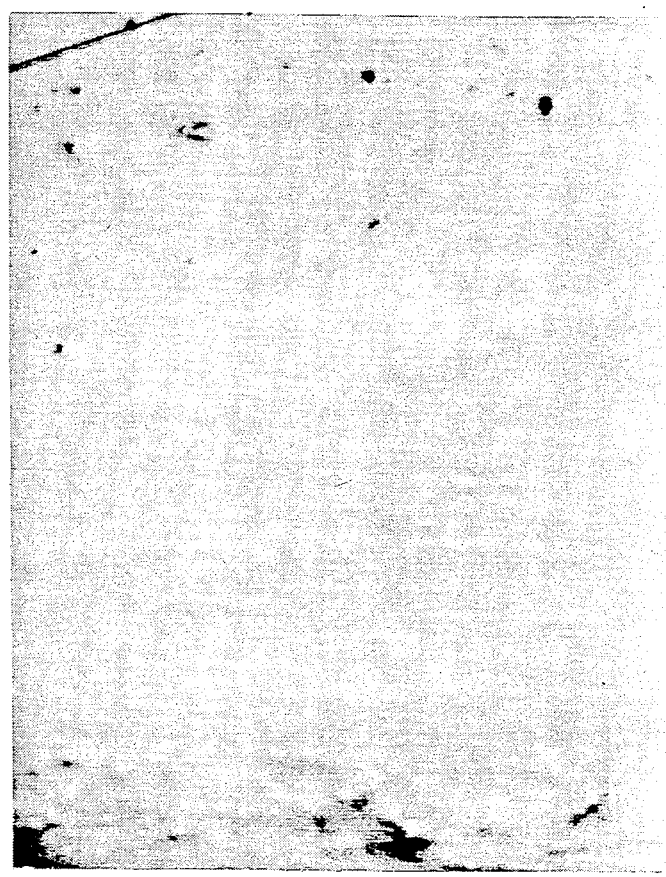
FIG. 2 is an optical microscope photograph showing an extruded strip made with the composition of Example 1, run 1 (control). This sample is the same as FIG. 1 with the exception that FIG. 1 composition contains 20 weight parts of crosslinked PVC. The scale of the photograph is the same as in FIG. 1.

A microscopic photograph was taken of strips of compositions 1 and 4. Composition 4 is shown in FIG. 1 which shows the microscopic rough nature of the surface. This surface roughness is what creates the satin feel and frosting effect of the articles of this invention. As can be seen from FIG. 1, the roughness is of a very fine nature in that it is evenly spaced across the surface and the peaks and valleys are small and uniform. FIG. 2 is a microscopic photograph of the control showing a smooth surface.

EXAMPLE 2

The following compositions in Table III were mixed as in Example 1 and bottles were made by extrusion blow molding the compositions.

TABLE III

| Ingredient | 1 (control) | 2 | 3 | 4 | 5 |
|---|---|---|---|---|---|
| [1]PVC | 100 | 80 | 80 | 80 | 60 |
| [2]Crosslinked PVC #1 | — | 20 | — | — | — |
| [3]Crosslinked PVC #2 | — | — | 20 | — | — |
| [4]Crosslinked PVC #3 | — | — | — | 20 | 40 |
| Tin Stabilizer | 2 | 2 | 2 | 2 | 2 |
| Impact Modifier | 10.5 | 10.5 | 10.5 | 10.5 | 10.5 |
| Processing Aids & Lubricants | 2.95 | 2.95 | 2.95 | 2.95 | 2.95 |
| Blue tint | 0.4 | 0.4 | 0.4 | 0.4 | 0.4 |
| [5]% Haze | 5.98 | 58.6 | 55.37 | 18.09 | 25.16 |

[1]PVC homopolymer as in Example 1
[2]Tan $\delta$ = 0.34
[3]Tan $\delta$ = 0.40
[4]Tan $\delta$ = 0.56
[5]As measured on molded bottle sections The % haze values show that the control had little haze while the compositions containing crosslinked PVC had much higher haze. Also, compositions 4 and 5 contained a crosslinked PVC which was more lightly crosslinked than the PVC used in compositions 2 and 3 as evidenced by the higher tan $\delta$ of the lightly crosslinked PVC. Even 40 weight parts of the lightly crosslinked PVC of composition 5 did not give the degree of frosting (haze) as did the 20 part level of a more crosslinked PVC.

All of the bottles made with the compositions containing crosslinked PVC were of good quality and exhibited a frosted surface while the bottles made with the control had smooth surfaces.

EXAMPLE 3

This Example is presented to demonstrate a process to produce a crosslinked resin suitable for use in this invention. An 1100 gallon reactor equipped with agitation and cooling means was used in this Example. The following polymerization recipe was used:

TABLE IV

| Ingredient | Parts by Wt. |
|---|---|
| Vinyl Chloride | 100 |
| Water (demineralized) | 150 |
| Diallyl phthalate | 0.260 |
| Polyacrylic Acid Dispersant | 0.025 |
| NaOH | 0.0025 |
| Isopropyl Alcohol | 0.120 |
| Low Hydrolysis (55%) PVA | 0.300 |
| 2-ethyl Hexyl Peroxydicarbonate | 0.045 |
| Phenolic Shortstop | 0.020 |

The ingredients were charged according to the two poly method disclosed in U.S. Pat. No. 4,668,707, incorporated herein by reference. The reaction was conducted at 53° C. The NaOH was charged as a solution in water after 15 minutes into the reaction (about 1% conversion). At 275 minutes the reaction was terminated with the phenolic shortstop. The resin was removed from the reactor, stripped of residual monomer and dried to a free flowing powder.

The resin particles were agglomerated, irregular shaped, porous, crosslinked resin particles which were absent a skin with the following properties:

| | |
|---|---|
| Weight average particle size - | 160 microns |
| Mercury porosity - | 0.407 cc/gm |
| Powder mix time - | 216 seconds |
| Complex viscosity - | 20 × $10^5$ poise |
| Tan $\delta$ | 0.5 |

This example demonstrates a crosslinked resin suitable for use in this invention. The tan $\delta$ indicates a significant amount of crosslinking. The amount of crosslinking can be varied by the level of crosslinking agent (diallyl phthalate) in the polymerization recipe.

We claim:

1. An optically transparent article exhibiting a frosted appearance comprising a mixture of polyvinyl chloride and crosslinked polyvinyl chloride wherein said crosslinked polyvinyl chloride has a complex viscosity of between $0.9 \times 10^5$ and less than $2.55 \times 10^6$ poise, said polyvinyl chloride is present at a level from about 3 to about 97 weight parts and said crosslinked polyvinyl chloride is present at a level of from about 97 to about 3 weight parts, wherein the total weight parts of polyvinyl chloride and crosslinked polyvinyl chloride is equal to 100, and wherein said article has a haze value of greater than about 50% measured in the frosted state, and a light transmission of greater than about 60% measured on said article after said frosting has been eliminated by compression molding under high pressure and cooling under pressure.

2. An article of claim 1 wherein said crosslinked polyvinyl chloride has a complex viscosity between $2.2 \times 10^5$ and $1.4 \times 10^6$.

3. An article of claim 2 wherein said crosslinked polyvinyl chloride is present at from about 10 to about 20 weight parts per 100 total weight parts polyvinyl chloride.

4. An article of claim 3 wherein said crosslinked polyvinyl chloride has a tan $\delta$ of from about 0.1 to about 0.5.

5. An article of claim 1 selected from the group consisting of bottles, sheets, draperies, louvers, tubing, films, and window panes.

6. An article of claim 5 wherein said article is a frosted bottle.

7. An article of claim 6 wherein said bottle is a tinted bottle.

8. An article of claim 1 further comprising at least 10 weight parts plasticizer per 100 total parts polyvinyl chloride.

9. An article of claim 1 comprising from about 60 to about 97 weight parts of polyvinyl chloride and from about 3 to about 40 weight parts of crosslinked polyvinyl chloride, wherein the total weight parts of crosslinked polyvinyl chloride and polyvinyl chloride is equal to 100.

10. An article of claim 1 wherein said polyvinyl chloride has an inherent viscosity of from about 0.4 to 2.5 as measured according to ASTM procedure D-1243.

11. An article of claim 1 wherein said polyvinyl chloride has an inherent viscosity of from 0.4 to less than 1.4 as measured according to ASTM procedure D-1243.

12. An optically transparent frosted article formed from a composition comprising a polymer mixture, said mixture comprising a first polymer selected from the group consisting of cellulose acetate, cellulose acetate butyrate, ionomer resin, polycarbonate, polymethyl pentene, polysulfone, polystyrene, styrene butadiene thermoplastic elastomer, rigid polyvinyl chloride, semi-rigid polyvinyl chloride, flexible polyvinyl chloride, polyester, polyarylate and styrene acrylonitrile copolymer and a second polymer which is a crosslinked polymer miscible with said first polymer, and wherein said first polymer and said second polymer have different viscoelastic properties; and said composition further comprising less than 10 parts by weight plasticizer per 100 parts by total weight of polymer, and wherein the article has a haze value of greater than about 50%, and a light transmission of greater than about 60%.

13. A composition of claim 12 wherein said first polymer is a lighly crosslinked polyvinyl chloride having a tan $\delta$ greater than about 0.7 and said second polymer is a heavily crosslinked polyvinyl chloride having a tan $\delta$ less than about 0.5.

14. A composition of claim 13 wherein said lightly crosslinked polyvinyl chloride has a tan $\delta$ greater than about 0.9 and said heavily crosslinked polyvinyl chloride has a tan $\delta$ less than about 0.4.

15. A composition of claim 12 wherein said first polymer is a polyvinyl chloride having an inherent viscosity less than about 0.8 and wherein said second polymer is a polyvinyl chloride having an inherent viscosity greater than about 1.4.

16. A composition of claim 8 wherein said plasticizer is present at a level greater than about 40 weight parts.

17. A composition of claim 12 wherein said first polymer and said second polymer when mixed together have similar optical properties.

18. A process for producing an optically transparent frosted article comprising forming a polymeric composition, said polymeric composition comprises a first polymer and a second polymer, wherein said first polymer and said second polymer have different viscoelastic properties.

19. A process of claim 18 wherein, said polymeric composition comprises polyvinyl chloride and crosslinked polyvinyl chloride wherein said crosslinked polyvinyl chloride has a complex viscosity of between $0.9 \times 10^5$ and less than $2.55 \times 10^6$ poise, and less than 10 parts by weight plasticizer per 100 total parts by weight of polyvinyl chloride, and wherein said process yields an article having a haze value of greater than about 50% measured in the frosted state and a light transmission of greater than about 60% measured on said article after said frosting has been eliminated by compression molding under high pressure and cooling under pressure.

20. A process of claim 18 wherein said first polymer and said second polymer have similar optical properties.

21. A process of claim 19 wherein said crosslinked polyvinyl chloride is present at a level of from about 3 to about 40 weight parts and wherein the total weight parts of polyvinyl chloride and crosslinked polyvinyl chloride is equal to 100.

22. A process of claim 19 wherein said crosslinked polyvinyl chloride has a tan $\delta$ of from about 0.1 to about 0.5.

23. A process of claim 19 wherein the level of crosslinked polyvinyl chloride is from about 10 to about 20 weight parts.

24. A process of claim 22 wherein said crosslinked polyvinyl chloride has a tan $\delta$ of from about 0.2 to about 0.4.

25. A process of claim 19 wherein said polyvinyl chloride and said crosslinked polyvinyl chloride are mixed together at a temperature less than 200° C. prior to forming.

26. A process of claim 18 wherein said article is formed by a process selected from the group consisting of extrusion blow molding, injection blow molding, extrusion, injection molding, thermoforming, pultrusion and calendering.

27. A process of claim 18 wherein said first polymer is selected from the group consisting of polymethyl methacrylate, cellulose acetate, cellulose acetate butyrate, ionomer resin, polycarbonate, polymethyl pentene, polysulfone, polystyrene, styrene butadiene thermoplastic elastomer, rigid polyvinyl chloride, semi-rigid polyvinyl chloride, flexible polyvinyl chloride, polyester, polyarylate, styrene acrylonitrile copolymer, ethylene ethyl acrylate copolymer, silicone and ethylene methylacrylate copolymer and said second polymer is a crosslinked polymer miscible with said first polymer.

28. An optically tranparent frosted polymeric article comprising a polymer mixture comprising a first polymeric component and a second polymeric component, wherein said first polymeric component and said second polymeric component have different viscoelastic properties, wherein said article is formed by calendaring, extruding, blow molding, injection blow molding, extrusion blow molding in a mold having a smooth surface.

29. An article of claim 28 wherein said first polymeric component and said second polymeric component have similar optical properties.

30. An article of claim 29 wherein said first polymeric component is selected from the group consisting of polymethyl methacrylate, cellulose acetate, cellulose acetate butyrate, ionomer resin, polycarbonate, polymethyl pentene, polysulfone, polystyrene, styrene butadiene thermoplastic elastomer, rigid polyvinyl chloride, semi-rigid polyvinyl chloride, flexible polyvinyl chloride, polyester, polyarylate, styrene acrylonitrile copolymer, ethylene ethyl acrylate copolymer, silicone and ethylene methylacrylate copolymer and said second polymeric component is a crosslinked polymer miscible with said first polymer.

31. An article of claim 28 selected from the group consisting of bottles, sheets, draperies, tubing, louvers, films and window panes.

32. An article of claim 31 wherein said article is a frosted bottle.

* * * * *